(12) United States Patent
Farres et al.

(10) Patent No.: US 12,330,603 B2
(45) Date of Patent: Jun. 17, 2025

(54) AUTOMATIC SELECTABLE TRAILER CONNECTION

(71) Applicant: Volvo Truck Corporation, Gothenburg (SE)

(72) Inventors: Lionel Farres, Heyrieux (FR); Mattias Holmberg, Jamestown, NC (US)

(73) Assignee: Volvo Truck Corporation, Gothenburg (SE)

( * ) Notice: Subject to any disclaimer, the term of this patent is extended or adjusted under 35 U.S.C. 154(b) by 400 days.

(21) Appl. No.: 17/798,987

(22) PCT Filed: Feb. 18, 2020

(86) PCT No.: PCT/EP2020/054258
§ 371 (c)(1),
(2) Date: Aug. 11, 2022

(87) PCT Pub. No.: WO2021/164856
PCT Pub. Date: Aug. 26, 2021

(65) Prior Publication Data
US 2023/0063569 A1 Mar. 2, 2023

(51) Int. Cl.
*B60T 13/26* (2006.01)
*B60D 1/24* (2006.01)
(Continued)

(52) U.S. Cl.
CPC .............. *B60T 13/263* (2013.01); *B60D 1/64* (2013.01); *B60T 13/662* (2013.01); *B60D 1/246* (2013.01)

(58) Field of Classification Search
CPC .... B60T 13/263; B60T 13/265; B60T 13/662; B60T 13/683; B60T 13/403; B60D 1/64; B60D 1/246
(Continued)

(56) References Cited

U.S. PATENT DOCUMENTS

| 4,223,953 | A | * | 9/1980 | Cruse | B60T 17/083 |
|   |   |   |   |   | 303/2 |
| 6,270,168 | B1 | * | 8/2001 | McCann | B60T 13/263 |
|   |   |   |   |   | 303/77 |

(Continued)

FOREIGN PATENT DOCUMENTS

| DE | 102006055570 A1 | 5/2008 |
| DE | 102010011978 A1 | 9/2011 |

(Continued)

OTHER PUBLICATIONS

International Search Report and Written Opinion for International Patent Application No. PCT/EP2020/054258, mailed Apr. 14, 2020, 12 pages.

*Primary Examiner* — Bradley T King
*Assistant Examiner* — James K Hsiao
(74) *Attorney, Agent, or Firm* — Withrow & Terranova, PLLC (57) ABSTRACT

The present disclosure relates to a pneumatic system for a truck having a first pair of couplers, typically gladhand couplers and a second pair of couplers, typically gladhand couplers, with only one pair used at a time for coupling a trailer, the system being able to detect which pair of glad hands a trailer is connected to. The present disclosure also relates to a truck comprising a pneumatic system according to the invention and a method carried out in a pneumatic system according to the invention.

14 Claims, 4 Drawing Sheets

(51) Int. Cl.
*B60D 1/64* (2006.01)
*B60T 13/66* (2006.01)

(58) Field of Classification Search
USPC .......................................................... 303/7
See application file for complete search history.

(56) References Cited

U.S. PATENT DOCUMENTS

| | | | | |
|---|---|---|---|---|
| 6,367,888 B1 * | 4/2002 | Kee | ............... | B60R 25/08 |
| | | | | 455/99 |
| 7,344,204 B2 * | 3/2008 | Cayer | ............... | F16K 11/0853 |
| | | | | 303/123 |
| 7,832,813 B2 * | 11/2010 | Bensch | ............... | B60T 13/385 |
| | | | | 303/20 |
| 8,240,777 B2 * | 8/2012 | Heren | ............... | B60T 13/686 |
| | | | | 303/7 |
| 8,467,950 B1 * | 6/2013 | Pfefferl | ............... | B60T 15/48 |
| | | | | 701/100 |
| 8,794,715 B2 * | 8/2014 | Bennett | ............... | B60T 13/263 |
| | | | | 303/119.2 |
| 8,926,026 B2 * | 1/2015 | Vuckovic | ............... | B60T 13/385 |
| | | | | 303/3 |
| 9,381,895 B1 * | 7/2016 | Smathers | ............... | B60T 13/26 |
| 9,815,446 B2 * | 11/2017 | Minato | ............... | B01D 53/0454 |
| 11,021,142 B2 * | 6/2021 | Riley | ............... | B60T 15/243 |
| 11,400,906 B2 * | 8/2022 | Bensch | ............... | B60T 13/683 |
| 11,827,198 B2 * | 11/2023 | Prigent | ............... | B60T 7/10 |
| 2002/0036428 A1 * | 3/2002 | Jacob | ............... | B60T 13/263 |
| | | | | 303/9.73 |
| 2010/0025141 A1 * | 2/2010 | Bensch | ............... | B60T 13/683 |
| | | | | 180/271 |
| 2010/0078988 A1 * | 4/2010 | Bensch | ............... | B60T 13/588 |
| | | | | 303/3 |
| 2012/0153711 A1 * | 6/2012 | Minato | ............... | B01D 53/0454 |
| | | | | 303/10 |
| 2015/0094906 A1 * | 4/2015 | Greene | ............... | B60T 13/263 |
| | | | | 701/33.9 |
| 2018/0354326 A1 * | 12/2018 | Keatley | ............... | B60D 1/58 |
| 2019/0111832 A1 * | 4/2019 | Schrag | ............... | B60Q 1/247 |
| 2019/0337502 A1 * | 11/2019 | Farres | ............... | B60T 15/027 |
| 2021/0009101 A1 * | 1/2021 | Riley | ............... | B60T 15/027 |

FOREIGN PATENT DOCUMENTS

| | | |
|---|---|---|
| EP | 2399793 A1 | 12/2011 |
| EP | 2821303 A1 | 1/2015 |
| EP | 3564082 A1 | 11/2019 |
| WO | 2009098003 A2 | 8/2009 |
| WO | 2014009457 A1 | 1/2014 |

\* cited by examiner

AUTOMATIC SELECTABLE TRAILER CONNECTION

This application is a 35 USC 371 national phase filing of International Application No. PCT/EP2020/054258, filed Feb. 18, 2020, the disclosure of which is incorporated herein by reference in its entirety.

FIELD OF THE DISCLOSURE

The present disclosure relates to a pneumatic system for a truck having a first pair of couplers, typically gladhand couplers and a second pair of couplers, typically gladhand couplers, with only one pair used at a time for coupling a trailer, the system being able to detect which pair of glad hands a trailer is connected to.

The present disclosure also relates to a truck comprising a pneumatic system according to the invention and a method carried out in a pneumatic system according to the invention.

BACKGROUND OF THE DISCLOSURE

A semi-trailer combination or a trailer combination comprises a truck (otherwise called 'tractor unit') and a trailer. The truck comprises a powertrain, a pneumatic supply system, a braking system, and a lot of other onboard systems.

Generally speaking, an electrical coupling arrangement and a pneumatic coupling arrangement are provided between the truck and the trailer. The present invention specifically concerns the pneumatic coupling arrangement.

The pneumatic coupling arrangement comprises a first pneumatic line, having a red color code in the art and a second pneumatic line having a blue color code in the art. The red color code refers to the air supply line to be connected to the parking brake spring loaded cylinders of the trailer, while the blue color code refers to the air supply line to be connected to the service brake of the trailer. When no pressure is supplied to the parking brake spring loaded cylinders (red line), the spring(s) of the cylinder(s) applies/apply a braking effort to the trailers wheels. By contrast, when the red line is pressurized, the spring(s) of the spring loaded cylinder(s) of the trailer is/are pushed back and the braking effort is released.

The pneumatic interconnection between the truck and the trailer is made by a pair of gladhand couplers, namely one gladhand coupler for the pressure air supply, notably used for the parking brake air supply and the other gladhand coupler for the service brake air supply. For each gladhand coupler (or gladhand connector), a gladhand from the truck can be coupled to a gladhand from the trailer to form an air conduit with an air-tight seal at the connection location.

A truck can be equipped with two pairs of gladhand couplers positioned at different locations, only one location being used at a time to couple a trailer. For example, a trailer can be coupled at the rear portion of the truck cabin (Back of Cabin) or alternatively, it can be coupled at the rear portion of the truck frame (End of Frame). It is then possible to connect the trailer at two different locations (End of Frame or Back of Cabin).

In this context, it is important to know 1) whether a trailer is coupled to the truck, and 2) if so at which location, since the air supply has to be sent on the pair of glad hands to which the trailer is connected. The behavior of the truck is indeed very different between a truck-only configuration and a trailer or semi-trailer combination configuration. Moreover, a reliable trailer connection status can be useful to other entities or control units aboard the truck, such that these entities or control units can adapt the behavior of some functions of the truck, notably engine management, anti-locking of brakes, stability control, etc. . . . .

Usually, a selector is provided inside the cabin of the truck and allows the driver of the truck to select manually the trailer connection status (trailer coupled or uncoupled, and if coupled, where it is coupled). But this manual selection is not reliable. For example, the driver can make a mistake when he selects the status of the trailer connection, or the gladhand couplers can be incorrectly coupled.

It is also known to use one or more additional sensors at the gladhand couplers to determine the trailer connection status, but it increases the cost of the system and these sensors are likely to be damaged as the gladhands are coupled and uncoupled many times during the truck life.

One of the objectives of the invention is to provide a reliable and an economical system which allows to determine/detect if a trailer is connected to the truck, and if so to which location the trailer is connected to.

SUMMARY OF THE DISCLOSURE

According to one aspect of the present disclosure, it is disclosed a pneumatic system for a truck, for a trailer connection, having a trailer air pressure supply line and a trailer service brake line and a first pair of couplers, typically gladhand couplers and a second pair of couplers, typically gladhand couplers, with only one pair used at a time for coupling a trailer, the system comprising:

a first selector valve and a second selector valve, each having a rest state in which the trailer air pressure supply line and the trailer service brake line are respectively connected to the first pair of couplers, and having an energized state in which the trailer air pressure supply line and the trailer service brake line are respectively connected to the second pair of couplers, a pneumatic control line for switching the first selector valve and the second selector valve from the rest state to the energized state, a solenoid valve which has a non-activated state in which the pneumatic control line is not pressurized, and an activated state in which the pneumatic control line is pressurized, and makes the first and second selector valves switch from the rest state into the energized state, wherein at least one pneumatic line test is performed while the solenoid valve is in the non-activated state and, depending on the output of said pneumatic line test, the solenoid valve can be switched into the activated state.

By "rest state", it is meant the state in which are the selector valves when no pneumatic energy is supplied to them.

By "energized state", it is meant the state in which are the selector valves when pneumatic energy is supplied to them. For the selector valves to be maintained in this state, it requires maintaining the pneumatic supply, which means to maintain the energization of the valves.

By "non-activated state", it is meant the state in which is the solenoid valve when no electrical energy is supplied to it.

By "activated state", it is meant the state in which is the solenoid valve when electrical energy is supplied to it. For the solenoid valve to be maintained in this state, it requires maintaining the electrical supply.

The present disclosure concerns the case in which the trailer connection status (coupled or uncoupled, and if coupled where) is determined by using at least a pneumatic line.

The terms "pneumatic line test" should be understood as a method for generating an air pressure pulse inside a pneumatic line and analyzing a pressure response in a timely manner, i.e. deducing, from a curve of pressure against time, aeraulic characteristics of the line. From such aeraulic characteristics of the line, it is determined whether the trailer is actually coupled, through the tested line, to the truck or not (i.e. the trailer connection status, pneumatically wise).

An ad hoc pneumatic test procedure allows to test the line using an already provided pressure sensor, thereby avoiding using additional sensing device.

Thanks to the pneumatic system according to the invention, it is possible to detect which pair of gladhand couplers a trailer is connected to, and also to automatically connect the pneumatic trailer lines to this pair of gladhand couplers.

It is also possible to have a selector allowing the driver of the truck to select manually the trailer connection status, under certain circumstances.

In various embodiments, one may possibly have recourse in addition to one and/or other of the following arrangements, taken alone or in combination.

According to one aspect, the pneumatic system comprises a control unit configured to electronically control the solenoid valve.

According to one aspect, the first selector valve and the second selector valve are distinct valves that are spaced one from the other, wherein the first selector valve, in its rest state, connects the trailer air pressure supply line to one coupler of the first pair, and in its energized state, connects the trailer air pressure supply line to one coupler of the second pair, and wherein the second selector valve, in its rest state, connects the trailer service brake line to the other coupler of the first pair, and in its energized state, connects the trailer service brake line to the other coupler of the second pair.

Thus, the first selector valve is coupled to the trailer air pressure supply line and the second selector valve is coupled to the trailer service brake line.

According to one aspect, the system further includes a pneumatic latch line for maintaining the first and second selector valves in the energized state, said pneumatic latch extending from the first and second selector valves to a flexible extensible pneumatic pipe forming an output of the first selector valve, so that when the first selector valve is in its energized state, compressed air flows from the flexible extensible pneumatic pipe to the pneumatic latch line, which maintains the first and second selector valves in their energized state.

The pneumatic latch line allows to maintain the first and second selector valves in their energized state independently from the electrical energization of the solenoid valve, i.e. from the state of the solenoid valve. Thus, the electrical energization of the solenoid valve is only needed (at the beginning) to switch the first and second selector valves from their rest state to their energized state. Once the first and second selector valves are in their energized state, the pneumatic latch line guarantees a pneumatic supply to the first and second selector valves. Hence, if the electrical energization of the solenoid valve is interrupted, the first and the second selector valves remain in their position, thereby providing a fail-safe configuration.

According to one aspect, each of the first and second selector valves, can be controlled either by pressurizing the pneumatic control line or the pneumatic latch line, according to an OR logic.

Only one command is needed at a time to energize the first and second selector valves.

According to one aspect, each of the first and second selector valves comprises a first actuation element connected to the pneumatic control line, and a second actuation element connected to the pneumatic latch line, and for each of the first and second selector valves, the first and second actuation elements are arranged in an OR logic to energize their respective selector valves. Basically, the first and second actuation elements may be a diaphragm or a piston, in known manner per se.

The pneumatic control line allows a pneumatic supply to the first and second selector valves through the actuation elements and the pneumatic latch line allows a pneumatic supply to the first and second selector valves through the secondary actuation elements.

According to one aspect, a pressure sensor is arranged at least on the trailer air pressure supply line. This pressure sensor is used for the pneumatic test line. No sensor is needed at the gladhand couplers.

According to one aspect, a relay valve is housed inside a trailer brake module of the pneumatic system. The relay valve allows a quick purge of the service brake line.

According to one aspect, a relay valve is housed inside a parking brake unit of the pneumatic system. The relay valve allows a quick purge of the supply line.

According to one aspect, a driver selection knob is provided so that the driver can select to which pair of couplers the trailer is connected. The driver selection knob allows the driver of the truck to choose between an automatic mode where the system detects automatically to which pair of couplers the trailer is connected, through the pneumatic line test and a manual mode where the driver indicates manually to which pair of gladhand couplers the trailer is connected.

According to one aspect, the pneumatic line test is done by a temporary inflation of the trailer air pressure supply line, and the outcome of the test is inferred from a pressure profile versus time acquired in response to the temporary inflation. It is to be noted that the test is achieved by using an existing pressure sensor, i.e. a sensor that is already provided on the truck, which acquires the pressure prevailing inside the pneumatic line. Accordingly, no additional sensor is required. The pressure sensor allows to monitor the pressure and in particular the pressure-time gradient during the temporary inflation, and the pressure time gradient allows to know if the pneumatic line is properly coupled to a trailer or if the pneumatic line is open to atmosphere or if the pneumatic line is closed.

According to one aspect, none of the couplers includes a sensor. There is no risk of damaging a sensor at the couplers. The system is thus more reliable.

According to one aspect, each of the first and second selector valves is a 4-ways, 2-positions reverse pneumatic valve, and the first selector valve includes a first port connected to the trailer air supply line, a second port connected to a coupler of the first pair of couplers, a third port connected to a coupler of the second pair of couplers and a fourth port connected to the atmosphere and the second selector valve includes a first port connected to the service brake line, a second port connected to a coupler of the first pair of couplers, a third port connected to the other coupler of the second pair of couplers and a fourth port connected to the atmosphere, and for each of the first and second selector valve, in the rest state, the first port is connected to the second port and the third port is connected to the fourth port and in the energized state, the first port is connected to the third port and the second port is connected to the fourth port. Venting the coupler which is not connected to the supply line and the coupler which is not connected to the service brake line ensures that there is no residual air in these couplers.

According to one aspect, the solenoid valve is a 3-ways, 2-positions electro pneumatic valve, comprising a first port connected to a line of compressed air, a second port connected to the atmosphere and a third port connected to the pneumatic control line and, in the non-activated state, the third port is connected to the second port, and in the activated state, the first port is connected to the third port.

According to one aspect of the present disclosure, it is also disclosed a truck comprising a pneumatic system according to the invention, wherein one of the first pair and second pair of couplers is located at the rear portion of the truck cabin, and the other of the first pair and second pair of couplers is located at the rear portion of the truck frame.

According to one aspect, the first pair of couplers is located at the rear portion of the truck cabin (known as "Back of Cabin"), and the second pair of couplers is located at the rear portion of the truck frame (known as "End of Frame").

According to one aspect, there is provided a selector pneumatic block including the solenoid valve and the first and second selector valves.

It is thereby defined an optional feature embedded in a block, present or not according to the truck configuration.

The present disclosure is also directed to a method carried out using a pneumatic system according to the invention. The method comprising steps that consist to a)—perform a pneumatic line test on the first pair of couplers while the solenoid valve is in the non-activated state, and if the result is positive, infer that the truck is connected to a trailer at the first pair of couplers, b)—and if the result is negative, energize the solenoid valve so that the first and second selector valves switch into the energized state, c)—perform a pneumatic line test on the second pair of couplers, —and if the result is negative, infer that the truck is not connected to a trailer.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. For sake of clarity, various elements may not be represented at scale.

Figure 1:
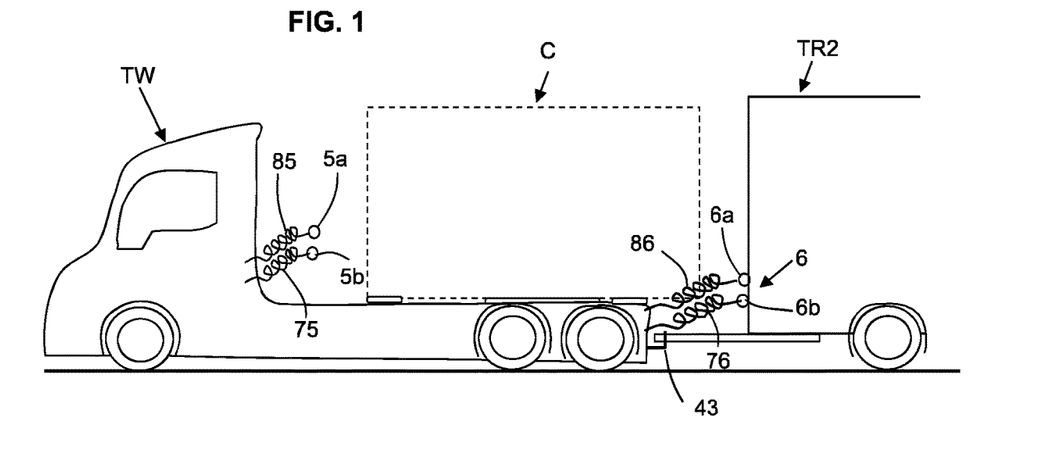
FIG. 1 illustrates diagrammatically a side view of a first configuration of a truck, where the truck is connected to a trailer at the rear portion of the truck frame.
Figure 2:
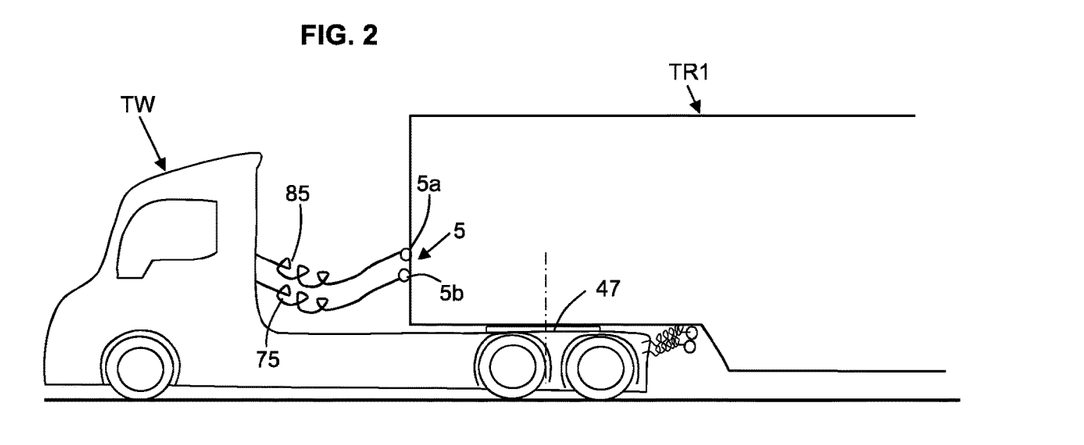
FIG. 2 illustrates diagrammatically a side view of a second configuration of a truck, where the truck is connected to a trailer at the rear portion of the truck cabin.

FIGS. 1 and 2 show a truck denoted TW (otherwise called 'tractor unit') in two different configurations. FIG. 1 illustrates the truck TW in a "trailer configuration" in which the truck TW tows a trailer TR2. FIG. 2 illustrates the truck TW in a "semi-trailer configuration" in which the truck TW tows a semi-trailer TR1, namely a trailer without any front axle.

The truck TW comprises, among other entities, a powertrain, a pneumatic supply system, and a braking system.

The front portion of the trailer TR2 or of the semi-trailer TR1 is detachably coupled to the truck TW.

In the example, the trailer TR2 or the semi-trailer TR1 includes a service brake and a parking brake (which includes for example a typical spring-loaded cylinder). In the example, both the service brake and the parking brake are powered up with compressed air (pneumatic energy). The compressed air source (not shown) is located on the truck TW, which means that there is also a pneumatic connection between the truck TW and the trailer TR2 (or the semi-trailer TR1).

Preferably, an electric connection is also provided between the truck TW and the trailer TR2 (or the semi-trailer TR1), typically to power up the rear lights of the trailer (or the semi-trailer).

The semi-trailer TR1 is mechanically attached to the truck through a "fifth wheel" 47 adapted on the truck TW. The trailer TR2 is mechanically attached to the truck through a coupling hook 43.

The pneumatic coupling arrangement comprises a pressure supply line 7 having a red color code, and used notably for the parking brake, and a service brake line 8 having a blue color code. The red color pressure supply line supplies the parking brake spring loaded cylinder(s) of the trailer TR2 (or semi-trailer TR1). The blue color supply line supplies the service brake to the brake cylinder(s) of the trailer TR2 (or semi-trailer TR1).

The truck TW and the trailer TR2 (or semi-trailer TR1) are interconnected via a pair of couplers, typically "gladhand couplers": one gladhand coupler for the parking brake line 7 and one gladhand coupler for the service brake line 8. Each gladhand coupler comprises one gladhand arranged on the truck, and a complementary gladhand arranged on the trailer TR2 (or semi-trailer TR1). Gladhand coupler resembles a pair of "hands shaking" when gladhands are interlocked, hence the name.

Even though gladhand couplers are actually the standard for the truck-trailer pneumatic connection, the invention can obviously be implemented with other types of couplers.

The truck TW is equipped with two pairs of gladhand couplers: a first pair 5 of gladhand couplers and a second pair 6 of gladhand couplers. Only one pair is used at a time for coupling a trailer.

In FIG. 1, the trailer TR2 is connected through the second pair 6 of gladhand couplers at the rear portion of the truck frame (End of Frame). For the red color pressure supply line 7, the second pair 6 of gladhand couplers comprises a first gladhand coupler with a gladhand 6b arranged on the truck TW and a complementary gladhand 6d arranged on the trailer TR2. The gladhand 6b arranged on the truck TW cooperates with the complementary gladhand 6d arranged on the trailer TR2. The gladhand 6b arranged on the truck TW lies at the free end of a flexible extensible pneumatic pipe 76, said extensible pneumatic pipe being coupled to the truck air brake system, and the gladhand 6d arranged on the trailer TR2 is attached to the front wall of the trailer TR2.

Similarly, for the blue color service brake line 8, the second pair 6 of gladhand couplers comprises a second gladhand coupler with a gladhand 6a arranged on the truck TW and a complementary gladhand 6c arranged on the trailer TR2. The gladhand 6a arranged on the truck TW cooperates with the complementary gladhand 6c arranged on the trailer TR2. The gladhand 6a arranged on the truck lies at the free end of a flexible extensible pneumatic pipe 86, said extensible pneumatic pipe being coupled to the truck air brake system and the gladhand 6c arranged on the trailer is attached to the front wall of the trailer TR2.

The first pair 5 of gladhand couplers is not connected to any trailer or semi-trailer.

Advantageously, and as shown on FIG. 1, the chassis of the truck TW supports a container C (shown in dotted line), additionally to the trailer TR2. The container C is mechanically attached to the chassis of the truck TW.

In FIG. 2, the semi-trailer TR1 is connected through the first pair 5 of gladhand couplers at the rear portion of the truck cabin. For the red color pressure supply line 7, the first pair 5 of gladhand couplers comprises a first gladhand coupler with a gladhand 5b arranged on the truck TW and a complementary gladhand 5d arranged on the semi-trailer TR1. The gladhand 5b arranged on the truck TW cooperates with the complementary gladhand 5d arranged on the semi-trailer TR1. The gladhand 5b arranged on the truck is provided at the free end of a flexible extensible pneumatic pipe 75, said extensible pneumatic pipe being coupled to the truck air brake system, and the complementary gladhand 5d arranged on the semi-trailer TR1 is attached to the front wall of the semi-trailer TR1.

Similarly, for the blue color service brake line 8, the first pair 5 of gladhand couplers comprises a second gladhand coupler with a gladhand 5a arranged on the truck TW and a complementary gladhand 5c arranged on the semi-trailer TR1. The gladhand 5a arranged on the truck TW cooperates with the complementary gladhand 5c arranged on the semi-trailer TR1. The gladhand 5a arranged on the truck is provided at the free end of a flexible extensible pneumatic pipe 85, said extensible pneumatic pipe being coupled to the truck air brake system and the complementary gladhand 5c arranged on the trailer is usually fixedly attached to the front wall of the semi-trailer TR1.

The second pair 6 of gladhand couplers is not connected to any trailer or semi-trailer.

Alternatively, the truck could be connected to a trailer via the first pair 5 of gladhand couplers. In the following description, the term "trailer" will be used understanding that it could also applied to a semi-trailer.

Figure 3:
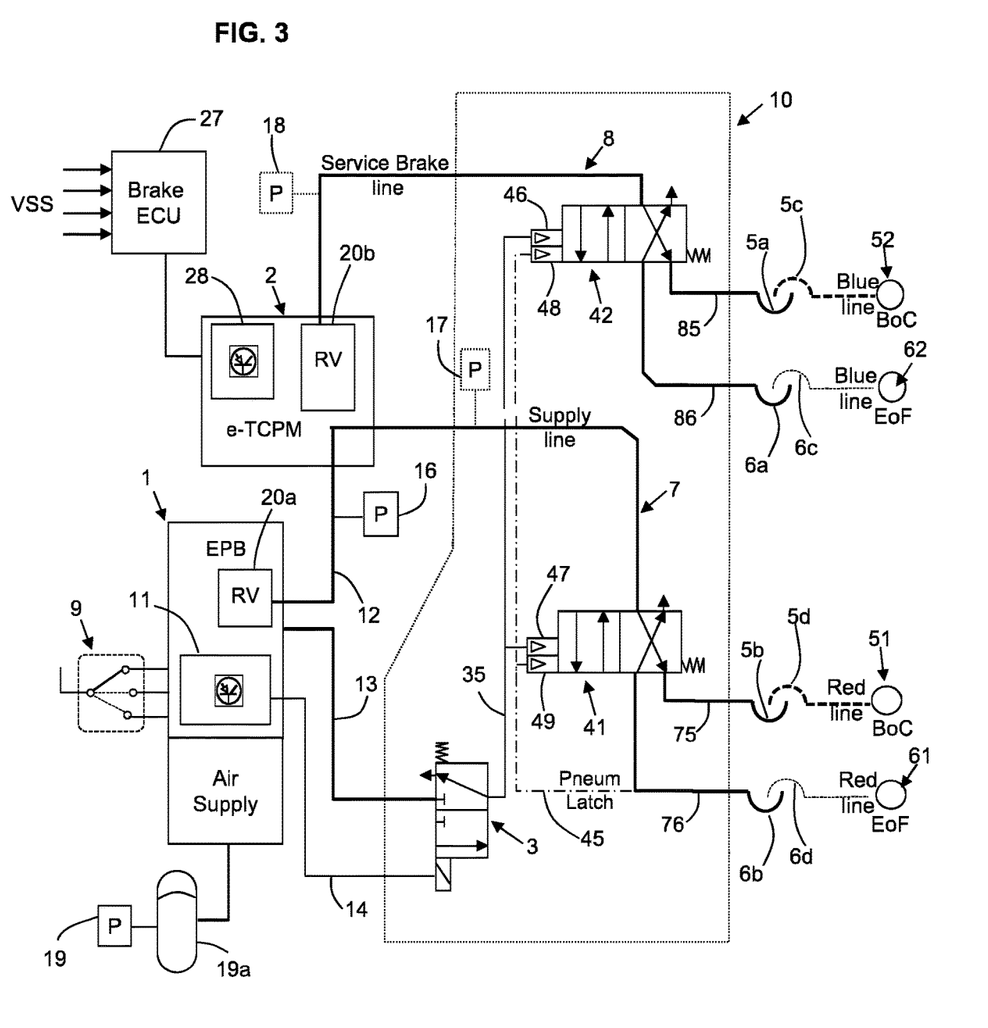
FIG. 3 shows a schematic block diagram of an example of a system promoted in the present disclosure.

As illustrated in FIG. 3, the system comprises an Electronic Parking Brake (EPB) unit 1 having an Electronic Control Unit (ECU) 11. The parking brake unit 1 is in charge of supplying various braking components of the truck TW, and also in charge of supplying compressed air to the system via pneumatic lines 12, 13.

In the specific embodiment of the figures, the pneumatic line 12 feeds both the parking brake line 7 and the trailer service brake line 8. The pneumatic line 13 is connected to a solenoid valve (also known as "electro-pneumatic valve") 3, the functioning of which will be described hereafter.

A pressure sensor 16 is provided on the pneumatic line 12, for measuring the pressure in the supply line 7. A pressure sensor 17 may also be provided on the trailer air pressure supply line 7, and a pressure sensor 18 may also be provided on the trailer service brake line 8.

The pressure supply line 7 is connected to a first relay valve 20a and the trailer service brake line 8 is connected to a second relay valve 20b. The first relay valve 20a permits to vent (resp. pressurize) the pressure supply line 7 when the truck stops (resp. moving), in order to activate the parking brake (resp. in order to deactivate the parking brake). The second relay valve 20b permits to quickly supply (resp. vent) the service brake line 8 when service brake is applied (resp. released).

Further, the system comprises at least one air reservoir 19a with its own pressure sensor 19.

The system also comprises a trailer brake module 2 having a control module 28 receiving information from a brake control unit 27 on the rotation speed of each vehicle wheel VSS in order to provide a wheel anti-locking function (known in the art as ABS or ABR) when an emergency brake is made by the driver of the truck.

Further, the system comprises a first selector valve 41 and a second selector valve 42. Each of the first and second selector valves 41, 42 is a 4-ways, 2 positions reverse pneumatic valve.

Preferably, each of the first and second selector valves 41, 42 is a pneumatically controlled, which means that the first and second selector valves 41, 42 are connected to a pneumatic control line 35 which makes the first and second selector valves 41, 42 to switch when the control line 35 is pressurized. The first selector valve 41 and the second selector valve 42 each have a rest state configured to connect the trailer air pressure supply line 7 and the trailer service brake line 8 to the first pair 5 of gladhand couplers, and have an energized state configured to connect the trailer air pressure supply line 7 and the trailer service brake line 8 to the second pair 6 of gladhand couplers.

The first selector valve 41 and the second selector valve 42 are distinct and spaced from one another.

In a non-represented variant, the selector valve 41 and the second selector valve 42 could be arranged in an all-in-line configuration, with a common control elements.

In its rest state, the first selector valve 41 connects the trailer air pressure supply line 7 to the gladhand coupler 5b (also known as "gladhand") of the first pair 5 of gladhand couplers. In its energized state, the first selector valve 41 connects the trailer air pressure supply line 7 to the gladhand 6b of the second pair 6 of gladhand couplers.

In its rest state, the second selector valve 42 connects the trailer service brake line 8 to the second gladhand coupler 5a of the first pair 5 of gladhand couplers. In its energized state, the second selector valve 42 connects the trailer service brake line 8 to the second gladhand coupler 6a of the second pair 6 of gladhand couplers.

The first selector valve 41 includes a first port connected to the trailer air supply line 7, a second port connected to the gladhand 5b of the first pair 5 of gladhand couplers, a third port connected to the gladhand 6b of the second pair 6 of gladhand couplers and a fourth port connected to the atmosphere.

The second selector valve 42 includes a first port connected to the service brake line 8, a second port connected to the other gladhand coupler 5a of the first pair 5 of gladhand couplers, a third port connected to the other gladhand coupler 6a of the second pair 6 of gladhand couplers and a fourth port connected to the atmosphere.

For each of the first and second selector valve 41, 42, in the rest state, the first port is connected to the second port and the third port is connected to the fourth port and in the energized state, the first port is connected to the third port and the second port is connected to the fourth port.

The solenoid valve 3 is controlled by the control unit 11. Said solenoid valve 3 is, as its name indicates, electrically controlled.

It is a 3-ways, 2-positions electro-pneumatic valve, including an electromagnet (or solenoid). It has a non-activated state (in which no current flows through the coils of the solenoid) configured to vent the pneumatic control line 35 connected to an actuation element 46, 47, including an orifice, of each of the first and second selector valves 41, 42. The first selector valve 41 and the second selector valve 42 stay then in their rest state. The solenoid valve 3 has also an activated state (in which an electrical current flows through the coils of the solenoid, producing a magnetic field) in which the pneumatic control line 35 is supplied with compressed air, which makes the first and second selector valves 41, 42 switch into the energized state.

The solenoid valve 3 comprises a first port connected to a line of compressed air 13, a second port connected to the atmosphere and a third port connected to the pneumatic control line 35 and, in the non-activated state, the third port is connected to the second port, and in the activated state, the first port is connected to the third port.

The solenoid valve 3 is electronically controlled by the control unit 11 through a wire 14. The control strategy of the solenoid valve 3 depends on a result of a pneumatic test line.

Further, the system comprises a pneumatic latch line 45 pneumatically connecting the flexible extensible pneumatic pipe 76 forming an output of the first selector valve 41 which is pressurized when the first selector valve is in its energized state, for maintaining the first and second selector valves 41,42 in their energized state.

The first and second selector valves 41, 42 comprises a secondary actuation element 48, 49 connected to the pneumatic latch line 45. For example, the secondary control element 48, 49 can include an orifice arranged in the first and second selector valves 41, 42.

The control element 46, 47 and the secondary control element 48, 49 of each of the first and second selector valves 41, 42 are arranged in an "OR" logic to energize the respective selector valve they belong to: This means that both the first selector valve 41 and the second selector can be controlled either through the pneumatic control line 35 OR through the pneumatic latch line 45.

When the pneumatic latch line 45 is pressurized, it maintains the first and second selector valves 41, 42 in their energized state, independently from the configuration of the solenoid valve 3 and therefore from the pressure inside the control line 35. This means that the electrical energization of the solenoid valve 3 can be stopped (i.e. the solenoid can be switched off) without switching the first and second selector valves 41, 42 to their rest states. They remain each in their energized state thanks to the pneumatic latch line 45 acting as a secondary control line through the secondary actuation element 48, 49. The aim of the system is to detect if a trailer (or a semi-trailer) is coupled to the truck, and if so to which one of the first pair 5 or second pair 6 of gladhand couplers.

At the beginning, the trailer connection status is unknown. The solenoid valve 3 is in its non-activated state and the first and second selector valves 41, 42 are in their rest state. Thus, the solenoid valve 3 connects the pneumatic control line 35 to the atmosphere. The first selector valve 41 connects the pressure supply line 7 to the gladhand 5b (arranged on the truck) of the first pair 5 of gladhand couplers and connects the gladhand 6b (arranged on the truck) of the second pair 6 of gladhand couplers to the atmosphere. The second selector valve 42 connects the service brake line 8 to the gladhand 5a (arranged on the truck) of the first pair of gladhand couplers and connects the gladhand 6a (arranged on the truck) of the second pair 6 of gladhand couplers to the atmosphere.

A pneumatic line test is then realized. An air pressure pulse is sent through the pressure supply line 7. The pressure sensor 17 measures the response of the system to this air pressure pulse and determines the status of the connection of the first pair 5 of gladhand couplers to a trailer. It means the system determines if the gladhand 5b arranged on the truck of the first gladhand coupler of the first pair 5 of gladhand couplers is coupled to the complementary gladhand 5d arranged on the trailer of the first gladhand coupler of the first pair 5 of gladhand couplers and if the gladhand 5a arranged on the truck of the second gladhand coupler of the first pair 5 of gladhand couplers is coupled to the complementary gladhand 5c arranged on the trailer of the second gladhand coupler of the first pair 5 of gladhand couplers. The pneumatic line test will be further described hereafter.

If the result of the test is positive, then the system deduces that a trailer is coupled to the first pair 5 of gladhand couplers. If the result is negative, then the system deduces no trailer is coupled to the first pair 5 of gladhand couplers. Thus, the control unit 11 sends an electrical energization signal through the electrical line 14 to the solenoid valve 3. Under the action of the electrical energization signal, the solenoid valve 3 is switched into its activated state. The solenoid valve 3 connects the pneumatic control line 35 with the pressurized compressed air line 13. The pneumatic control line 35 then makes the first and second selector valves 41, 42 switch into their energized state.

In its energized state, the first selector valve 41 connects the pressure supply line 7 to the gladhand 6b arranged on the truck of the first gladhand coupler of the second pair 6 of gladhand couplers and connects the gladhand coupler (also known as "gladhand") 5b (arranged on the truck) of the first pair 5 of gladhand couplers to the atmosphere. In its energized state, the second selector valve 42 connects the service brake line 8 to the gladhand 6a (arranged on the truck) of the second pair 6 of gladhand couplers and connects the gladhand 5a (arranged on the truck) of the first pair 5 of gladhand couplers to the atmosphere.

Another pneumatic line test is then realized. An air pressure pulse is sent through the pressure supply line 7 and the pressure sensor 16 measures the response of the system to this air pressure pulse, and determines the status of the connection of the second pair 6 of gladhand coupler to a trailer. It means the system determines if the gladhand 6b arranged on the truck of the first gladhand coupler of the second pair 6 of gladhand couplers is coupled to the complementary gladhand 6d arranged on the trailer of the first gladhand coupler of the second pair 6 of gladhand couplers and if the gladhand 6a arranged on the truck of the second gladhand coupler of the second pair 5 of gladhand couplers is coupled to the complementary gladhand 6c arranged on the trailer of the second gladhand coupler of the second pair 6 of gladhand couplers.

If the result of the test is positive, then the system deduces a trailer is coupled to the second pair 6 of gladhand couplers. In this case, compressed air flows in the flexible extensible lines 76 and 86, respectively in output of the selector valves 41 and 42. The flexible extensible line 76 enables to pressurize the pneumatic latch line 45 and keep the selector valves 41, 42 in the second state even after the solenoid of the solenoid valve 3 is turned off. This allows saving electric energy because there is no need to keep the solenoid valve 3 in the activated state during the whole journey/travel.

When the air supply in the trailer air supply line 7 is stopped, for example when the parking brake is activated, the pneumatic latch line 45 is no more pressurized. Then, as shown on FIG. 3, a return spring provided in the selector valves 41, 42 makes the valves 41 and 42 to return in the rest state, which can therefore be considered as the state by default.

Thus, each of the first and second selector valves 41, 42 is a monostable valve. This means that each of the first and second selector valves 41, 42 automatically switches back to the first position after the control lines 35 and 45 are both depressurized (i.e. connected to the atmosphere).

If the result is negative, then the system deduces no trailer is coupled to the second pair 6 of gladhand couplers.

Optionally, the system can comprise a driver selection knob 9 installed in the cabin of the truck. This driver selection knob 9 comprises several positions among which one can be chosen by the driver. For example, the driver selection knob 9 comprises a first automatic position, a second position for choosing the first pair of gladhand couplers and a third position for choosing the second pair of gladhand couplers.

Preferably, the selection knob 9 is a rotating knob.

If the driver chooses the automatic position, the system detects automatically if a trailer is connected to the truck, and to which pair of gladhand couplers as explained below. The system is then in an automatic mode.

If the driver moves the knob 9 into the second position or the third position, it predefines the pair of gladhand couplers that will be tested through the pneumatic line test.

If the driver chooses the position corresponding to the first pair of gladhand couplers, the solenoid valve 3 stays in its non-activated state, the first and second selector valves 41, 42 stay in their rest state and the pneumatic line test is realized. If the result is positive, it consolidates the selection made by the driver. If the result is negative, it means the system does not detect a trailer coupled to the first pair 5 of gladhand couplers. A signal is sent to the driver so that he can check the position of the driver selection knob 9 and so that he can change it.

If the driver chooses the position corresponding to the second pair of gladhand couplers, the solenoid valve 3 is switched in its activated state and the first and second selector valves 41, 42 are switched in their energized state. The pneumatic line test is then realized. If the result is positive, it consolidates the selection made by the driver. If the result is negative, it means the system does not detect a trailer coupled to the second pair 6 of gladhand couplers. A signal is sent to the driver so he can check the position of the driver selection knob 9 and so that he can change it.

Figure 4:
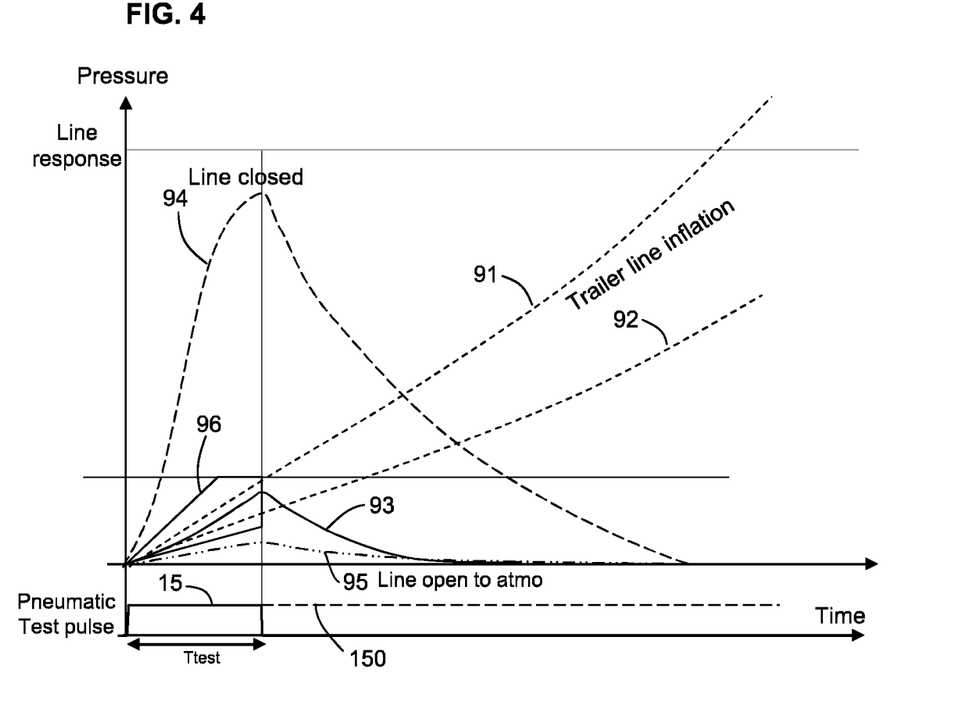
FIG. 4 shows a time-chart implemented in a method carried out according to the present disclosure.

FIG. 4 illustrates how the pneumatic test is carried out. The line under test here is the trailer supply line 7. In addition, the skilled person can consider a similar or identical test on the trailer service brake line 8.

There are various cases represented in the same time-chart. A pulse test 15 is generated in the line. In practice, an electro-valve supplying the line is open for a predetermined time period noted Ttest. Stated otherwise, we perform a temporary inflation of the test pneumatic line, from a deflated state. The outcome of the test is inferred from a pressure profile versus time acquired in response to the temporary inflation. The pressure time gradient during the temporary inflation is of particular interest.

Various responses corresponding to various situations are shown.

Chronogram 95 illustrates a case when the pneumatic lined is open to atmosphere. Time gradient during the temporary inflation is very low. Chronogram 94 illustrates a case when the pneumatic lined is closed. Time gradient during the temporary inflation is very high.

Chronograms 91,92,93 illustrate cases when the pneumatic lined is correctly coupled (gladhand attached). Time gradient during the temporary inflation is moderate. The area denoted 96 in the chart reflects an interval of possible time gradients considered to be representative of a proper connection (connection status=attached). There is a substantial volume of air pipe(s) in the trailer that provokes this moderate gradient.

Here we face two sub-cases, either the inflation of the trailer is required, or only the test is required but the inflation of the trailer is not required.

Chronogram 92 illustrates a case when the pneumatic line is correctly coupled and with inflation required. Time gradient during the temporary inflation is moderate but low. Chronogram 91 illustrates a similar case, but with a time gradient moderate but somewhat higher. Conversely, chronogram 93 illustrates a case when the pneumatic line correctly coupled but inflation is not required. At the end of the test time period, the electro-valve is shut off and the pressure in the line decreases back to 0.

When line inflation is required, the supply of the trailer air pressure supply line is continued (dotted line 150) and maintained as long as required by the trailer management function. We note here that the pneumatic test doesn't delay the normal supply of compressed air to the trailer.

The pressure sensor 16 already mentioned is used to monitor the pressure gradient in the line. The pulse duration Ttest can be made dependent on the pressure gradient. Test can be shorter if the gradient is high enough (but still below the "closed line" threshold). The pulse duration Ttest can be comprised between 400 ms and 1 second. According to one embodiment, duration Ttest can be comprised between 500 ms and 700 ms.

Figure 5:
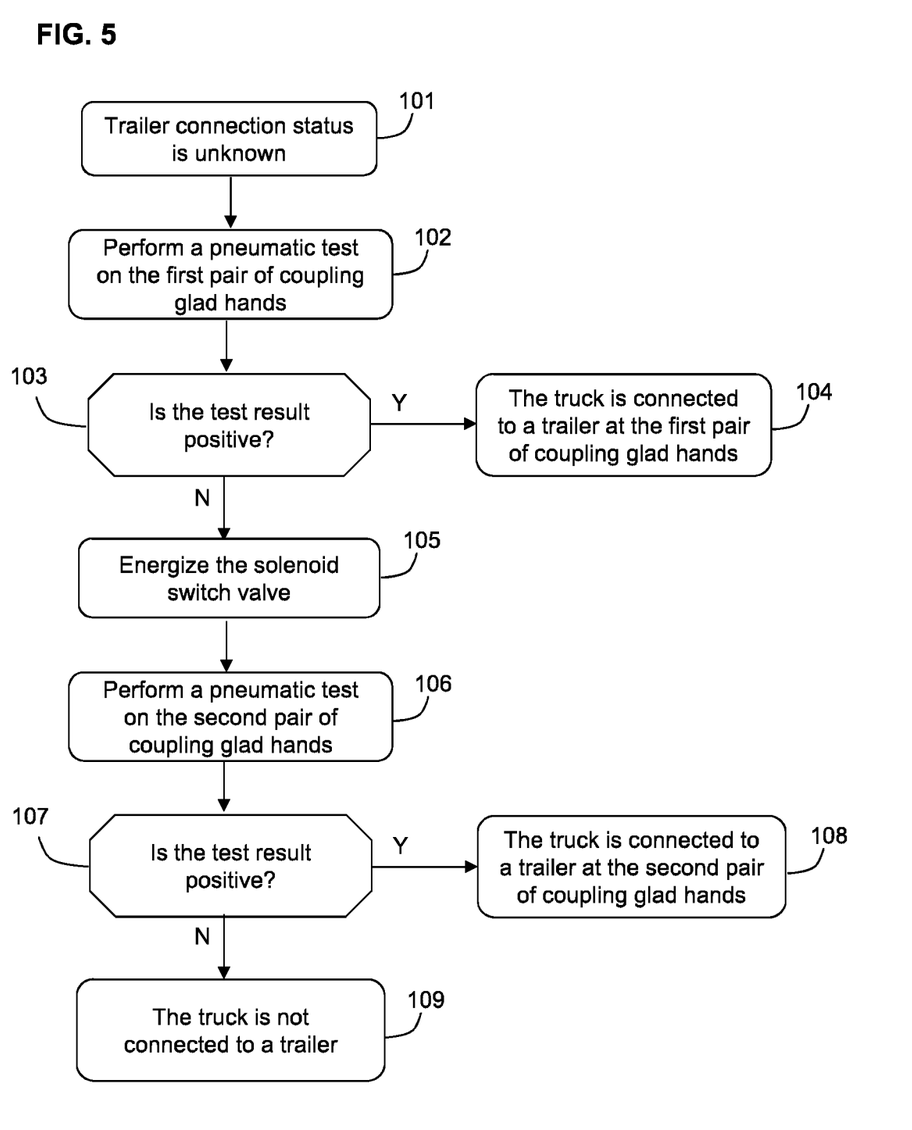
FIG. 5 illustrates a logic diagram of a method carried out according to the present disclosure.

The method carried out in a pneumatic system according to the invention is described referring to FIG. 5.

The step 101 represents a state "trailer connection status is unknown".

At step 102, a pneumatic test on the first pair 5 of gladhand couplers is performed.

At step 103, it is regarded if the test result is positive.

If the test result is positive, then the method goes to the step 104 stating the truck is connected to a trailer at the first pair 5 of gladhand couplers and the method is ended.

If the test result is negative, then the method goes to the step 105, and the solenoid valve 3 is activated.

At step 106, a pneumatic test on the second pair 6 of gladhand couplers is performed.

At step 107, it is regarded if the test result is positive.

If the test result is positive, then the method goes to the step 108 stating the truck is connected to a trailer at the second pair 6 of gladhand couplers and the method is ended.

If the test result is negative, then the method goes to the step 109 stating the truck is not connected to a trailer and the method is ended.

The invention claimed is:

1. A pneumatic system for a truck for a trailer connection, having a trailer air pressure supply line, a trailer service brake line, a first pair of couplers, and a second pair of couplers, with only one pair of couplers used at a time for coupling a trailer, the system comprising:
   a first selector valve and a second selector valve, each having a rest state in which the trailer air pressure supply line and the trailer service brake line are respectively connected to the first pair of couplers, and having an energized state in which the trailer air pressure supply line and the trailer service brake line are respectively connected to the second pair of couplers, a pneumatic control line for switching the first selector valve and the second selector valve from the rest state to the energized state, and a solenoid valve which has a non-activated state in which the pneumatic control line is not pressurized and an activated state in which the pneumatic control line is pressurized and makes the first and the second selector valves switch from the rest state into the energized state, wherein at least one pneumatic line test is performed while the solenoid valve is in the non-activated state and, depending on the output of the pneumatic line test, the solenoid valve can be switched into the activated state.

2. The pneumatic system of claim 1:
wherein the first selector valve and the second selector valve are distinct valves that are spaced one from the other,
wherein the first selector valve, in its rest state, connects the trailer air pressure supply line to one coupler of the first pair of couplers, and in its energized state, connects the trailer air pressure supply line to one coupler of the second pair of couplers, and
wherein the second selector valve, in its rest state, connects the trailer service brake line to the other coupler of the first pair of couplers, and in its energized state, connects the trailer service brake line to the other coupler of the second pair of couplers.

3. The pneumatic system of claim 1, wherein the system further includes a pneumatic latch line for maintaining the first and the second selector valves in the energized state, the pneumatic latch extending from the first and the second selector valves to a flexible extensible pneumatic pipe forming an output of the first selector valve, so that when the first selector valve is in its energized state, compressed air flows from the flexible extensible pneumatic pipe to the pneumatic latch line, which maintains the first and the second selector valves in their energized state.

4. The pneumatic system of claim 3, wherein each of the first and the second selector valves can be controlled either by pressurizing the pneumatic control line or the pneumatic latch line, according to a OR logic.

5. The pneumatic system of claim 1, wherein a pressure sensor is arranged at least on the trailer air pressure supply line.

6. The pneumatic system of claim 1, wherein a relay valve is housed inside a trailer brake module of the pneumatic system.

7. The pneumatic system of claim 1, wherein a driver selection knob is provided so that the driver can select to which pair of couplers the trailer is connected.

8. The pneumatic system of claim 1, wherein the pneumatic line test is done by a temporary inflation of the trailer air pressure supply line, and the outcome of the test is inferred from a pressure profile versus time acquired in response to the temporary inflation.

9. The pneumatic system of claim 1, wherein none of the couplers includes a sensor.

10. The pneumatic system of claim 1:
wherein each of the first and the second selector valves is a 4-ways, 2-positions reverse pneumatic valve,
wherein the first selector valve includes a first port connected to the trailer air supply line, a second port connected to a coupler of the first pair of couplers, a third port connected to a coupler of the second pair of couplers, and a fourth port connected to the atmosphere,
wherein the second selector valve includes a first port connected to the service brake line, a second port connected to the other coupler of the first pair, a third port connected to the other coupler of the second pair of couplers, and a fourth port connected to the atmosphere, and
wherein for each of the first and the second selector valve, in the rest state, the first port is connected to the second port and the third port is connected to the fourth port, and in the energized state, the first port is connected to the third port and the second port is connected to the fourth port.

11. The pneumatic system of claim 1:
wherein the solenoid valve is a 3-ways, 2-positions electro pneumatic valve, comprising a first port connected to a line of compressed air, a second port connected to the atmosphere, and a third port connected to the pneumatic control line and
wherein, in the non-activated state, the third port is connected to the second port, and in the activated state, the first port is connected to the third port.

12. A truck comprising the pneumatic system of claim 1, wherein one of the first pair and the second pair of couplers is located at the rear portion of the truck cabin, and the other of the first pair and the second pair of couplers is located at the rear portion of the truck frame.

13. A method carried out using the pneumatic system of claim 1, the method comprising:
performing a pneumatic line test on the first pair of couplers while the solenoid valve is in the non-activated state,
if the result is positive, inferring that the truck is connected to a trailer at the first pair of couplers, and
if the result is negative, energizing the solenoid valve so that the first and the second selector valves switch into the energized state, and
performing a pneumatic line test on the second pair of couplers, and
if the result is negative, inferring that the truck is not connected to a trailer.

14. The pneumatic system of claim 1, wherein the first pair of couplers comprise a first pair of gladhand couplers and wherein the second pair of couplers comprise a second pair of gladhand couplers.

* * * * *